Aug. 16, 1938.    W. F. BERCK    2,127,243
PRINTING COUNTER FOR FLUID METERS
Filed Nov. 7, 1933    2 Sheets-Sheet 1

INVENTOR.
William F. Berck.
BY Townsend & Loftus
ATTORNEYS.

Aug. 16, 1938.  W. F. BERCK  2,127,243
PRINTING COUNTER FOR FLUID METERS
Filed Nov. 7, 1933  2 Sheets-Sheet 2
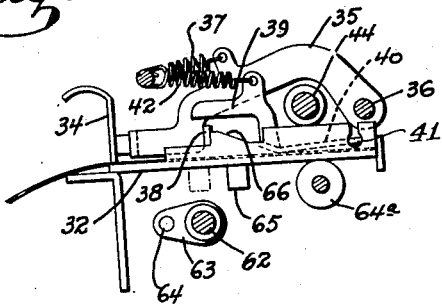
Fig. 4.
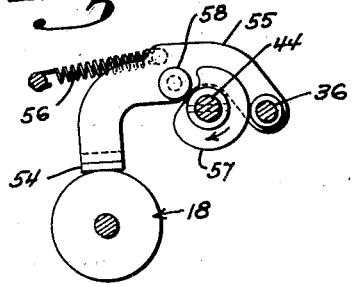
Fig. 5.
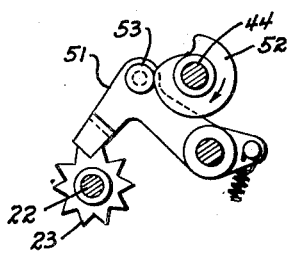
Fig. 6.
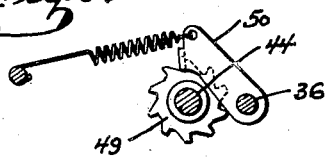
Fig. 7.
Fig. 8.
| OIL COMPANY | |
|---|---|
| 1036 - A Street, San Francisco. | |
| Customer's Order N° | Serial N° |
| Customers Name and Address. | |
| Quantity Delivered | |
| 68 —— 1 7 44 | |
| 67 —— 0 0 0 0 | |
| Rec'd by | |
| Driver | |
| Insert this end Tags bound here | |
INVENTOR.
William F. Berck.
BY Townsend & Loftus
ATTORNEYS.

Patented Aug. 16, 1938

2,127,243

UNITED STATES PATENT OFFICE 2,127,243

PRINTING COUNTER FOR FLUID METERS

William F. Berck, Oakland, Calif., assignor to Ralph N. Brodie Company, Oakland, Calif., a corporation of California Application November 7, 1933, Serial No. 696,983

2 Claims. (Cl. 234—2)

The present invention pertains to fluid meters and relates more particularly to counting mechanism for such meters by means of which a printed or graphic record may be made to indicate the quantity of fluid that has passed through the meter so that parties buying or selling fluid may be furnished with an accurate printed account of the quantity of fluid metered.

It is the object of the present invention to provide means for combination with a fluid meter that will make possible the printing of a record disclosing the exact amount of fluid that has passed through the meter, to provide a device that is safeguarded against tampering to alter or render incorrect the record printed thereby and to provide a device that is simple in construction and easily operated without undue loss of time by the attendant controlling the delivery of fluid through the meter. It is more specifically the object of this invention to provide a device that will be operated by a fluid meter to bring into a printing position a series of type numbers that will represent the number of gallons or other volumetric units that have passed through the meter, to provide for the printing of said numbers on a piece of paper, and also to provide for the printing of zeros on the same piece of paper prior to the commencement of operation of the meter to assure the purchaser that the printing and counting mechanism has been set to zero before measurement of the fluid and to provide means to prevent a second operation of the printing counter until it has been reset to a zero reading after the first operation.

In the following description I will refer to the meter as an oil meter and to the volumetric units measured thereby as gallons but it is to be understood that the mechanism to be described is equally applicable to meters for various types of fluids and that the measurement may be in any desired units.

One form of my invention is exemplified in the accompanying drawings and described in greater detail in the following specification in which further of its objects and advantages are made apparent.

In the drawings

Fig. 4 is a section on the line IV—IV of Fig. 1 with the casing and other extraneous parts removed to illustrate the sales slip holding and manipulating mechanism.

Fig. 5 is a section on the line V—V of Fig. 1 with extraneous parts removed to illustrate the construction of the printing mechanism.

Fig. 6 is a section taken on line VI—VI of Fig. 1 with extraneous parts removed to illustrate the construction of the mechanism for aligning the type numbers on the printing counter before the printing operation takes place and for locking the printing counter against operation during printing and resetting.

Fig. 7 is a sectional view on the line VII—VII of Fig. 1 with extraneous parts removed to show the construction of the pawl and ratchet wheel employed for preventing reverse rotation of the operating crank.

Fig. 8 is a view of a sales slip showing numerals as applied thereto by the printing mechanism.

Figure 1:
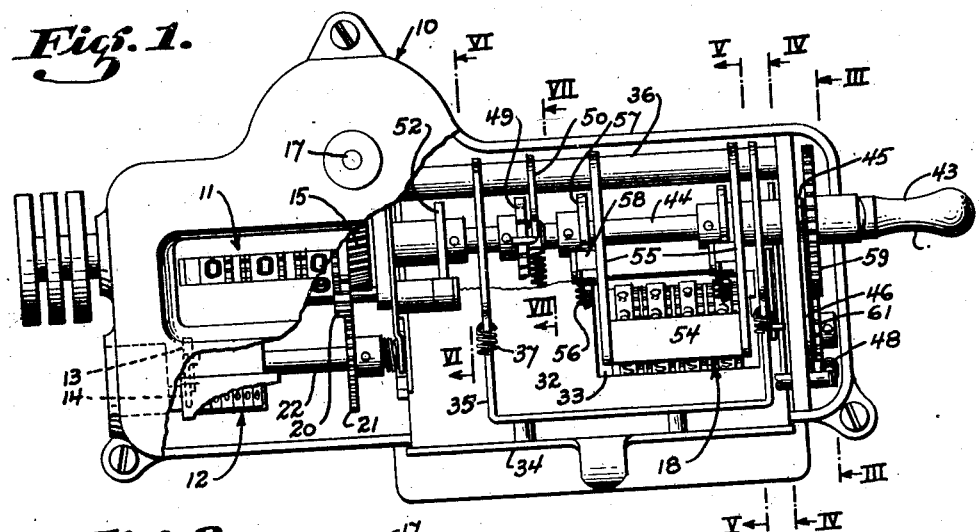
Fig. 1 is a plan view partially in section of a printing counter for fluid meters constructed in accordance with my invention.
Figure 2:
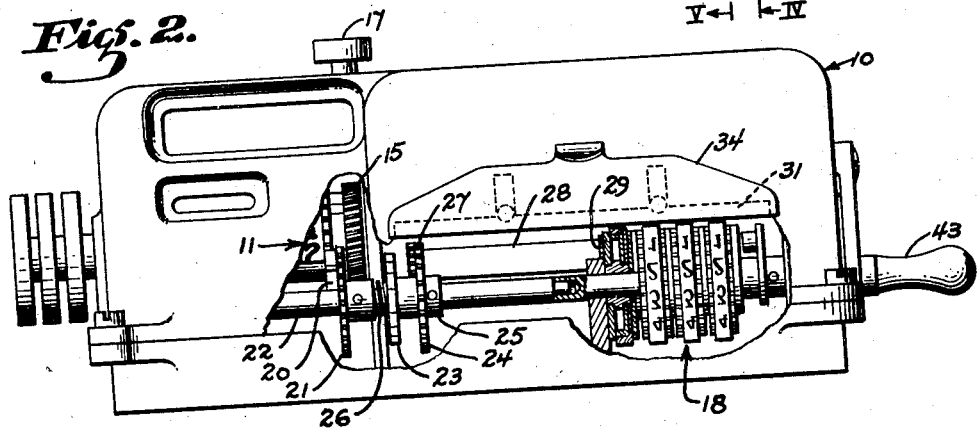
Fig. 2 is a front elevation of the printing counter shown in Fig. 1 also partly in section.

Referring more particularly to the drawings, I show a casing 10. This casing, which may be suitably secured to a fluid meter, contains a counting mechanism generally indicated at 11. This counting mechanism may be replaced by any conventional counter as its operation has no particular bearing on the subject matter of the present application.

A small registering mechanism 12 is also disposed within the casing 10 and is driven through gears 13 and 14 which connect it with a shaft 22, which shaft is rotated by the counting mechanism 11 as will hereinafter appear. The counting mechanism 11 is operated through a worm gear 15 and a worm (not shown) carried by a shaft 17, which shaft is rotated by operation of the meter in a well known manner.

The present invention is more directly concerned with a printing counter generally indicated at 18 which comprises a suitable number of rotatable counter wheels which are of conventional design except that the numerals naught to nine inclusive on their outer peripheries are type figures rather than the ordinary printed figures. These counter wheels are equipped with set back pawls and transfer plates in the usual manner to provide means for carrying over from units to tens and from tens to hundreds, etc., and for resetting the wheels to zero.

The means for driving the printing counter mechanism is as follows: A gear 20, which rotates with the set back counting mechanism 11 meshes with a gear 21 pinned to the shaft 22. The rotation of the gear 21 imparts rotation to a star wheel 23 and a gear 24 which are fixed with relation to a common hub member but freely rotatable on the shaft 22. A friction clutch which includes a collar 25 pinned to the shaft 22 and a spring 26 causes the gear 24 normally to rotate with the gear 21. The function of the friction clutch and the star wheel 23 is to permit the printing counter to be locked during the printing operation without affecting the registering mechanism 12.

A gear 27 meshes with the gear 24 and rotates a barrel 28 to which it is fixed. The opposite end of the barrel 28 carries a gear 29 meshing with a gear (not shown) which forms a part of and drives the printing counter mechanism 15 in a conventional manner. Thus, operation of the meter imparts driving movement through the mechanism above described to operate the printing counter which thereby registers the number of gallons that have been dispensed through the meter.

The forward face of the casing 10 is provided with a slot 31 through which a piece of paper or sales slip may be inserted to rest upon a plate 32 overlying the printing counter. The plate 32 is cut-away to provide an opening 33 directly above the printing counter so that when desired the sales slip may be pressed against the numerals on the upper face of the counter to imprint upon the slip the number of gallons indicated on the counter. It should be understood that printing ink is not necessary to this operation as the sales slips may be in duplicate or triplicate treated with carbon on one side or having carbon paper between them so that mere pressure of the slips against the printing counter will cause printing of the numbers upon them.

In using the device, the attendant inserts a sales slip into the slot 31 as described and then actuates the device in a manner presently to be described to print zeros on the sales slip, indicating that the printing counter has been set to zero before dispensing of the oil. The valve is then opened to permit flow of the oil through the meter to a point of delivery and the number of gallons passing through the meter is registered on the printing counter. The operator then again causes printing to take place so that the number of gallons dispensed is recorded on the sales slip. The sales slip is then removed and handed to the customer to form a permanent and accurate record.

In order to insert the sales slip, the operator must first lift a plate 34 which normally covers the slot 31. This plate 34, as best illustrated in Fig. 4 of the drawings, is carried by arms 35 pivoted rearwardly of the housing on a shaft 36. A spring 37 normally holds the arms and plate 34 in a downward position, closing the slot 31. When the plate 34 is lifted to insert the sales slip, a lug 38 on one of the arms 35 contacts an arm 39 to lift a presser plate 40 pivoted at 41 which bears against the tray 32 to hold the sales slip securely in position under tension of a spring 42. After the sales slip is inserted between the presser plate 40 and the tray, the attendant permits the closure plate 34 to drop from its raised position and return to substantially its initial position. This permits the presser plate 40 to swing downwardly from its elevated position and clamp the sales slip upon the tray so that the sales slip will be held in proper position on the tray and will move with the tray when the tray is moved from the first printing position to the second printing position.

When the sales slip has been properly positioned, the operator rotates a crank 43 which extends to a position exteriorly of the casing 10 through one complete revolution. This movement of the crank 43 centers the type on the printing counter in order that any number thereon that is not exactly in line to print properly will be brought into alignment with the other numbers. The same operation of the crank causes the printing to take place, then sets the printing counter back to zero, then moves the tray 32, which carries the sales slip, to a position for the next printing operation, and meanwhile causes the printing counter to be locked against operation until the full cycle of operation of the crank has been completed.

A description of the mechanism through which these above operations are accomplished follows.

In the first place it should be understood that the crank 43 is fitted to the end of a shaft 44 which extends through the casing 10. This shaft is fitted with a centralizing cam as illustrated at 45 in Fig. 3, which cam is circular except for a flat side as shown, and an arm 46 pivoted at 47 is pressed against the periphery of the cam under the tension of a spring 48, so that the crank 43 will tend to come to a stop under the influence of the arm 46 bearing against the flat side of the cam 45 upon each complete revolution. A ratchet wheel 49 fixed to the shaft 44, as shown in Fig. 7 of the drawings, and a spring-pressed pawl 50 serve to prevent operation of the crank 43 except in a clockwise direction.

Upon the initial turning movement of the crank 43 a spring-pressed pawl 51 (see Fig. 6) is urged into engagement with the star wheel 23. The star wheel has ten points corresponding to the ten numerals on the wheels of the printing counter and as the star wheel is fixed with relation to the gear 24, which forms a part of the driving mechanism of the printing counter, the pawl 51, which has a pointed end corresponding in shape to the spaces between the points of the star wheel positions one of the printing wheels of the printing counter and thereby causes the numerals of the printing counter to be brought into proper alignment, it being understood that the points of the star wheel are in proper position relative to the numerals on the counter to accomplish this purpose.

Movement of the pawl 51 into engagement with the star wheel 23 is effected by a cam 52 fixed to the shaft 44 and bearing against a roller 53 on the pawl. Due to the shape of the cam 52, the pawl is held in engagement with the star wheel except when the crank 43 has completed its full cycle so that at no time during the operation of the crank 43 is it possible for the meter to drive the printing counter. The friction clutch which yieldably connects the star wheel 23 and the gear 24 with the shaft 22 permits this operation.

The mechanism for printing is illustrated in Fig. 5 wherein a printing plate 54 is shown as supported on pivoted arms 55, which arms are urged downwardly by a spring 56. A cam 57 fixed to the shaft 44 normally maintains the printing plate 54 in a raised position by engagement with a roller 58 but upon rotation of the shaft 44 and cam 57 the printing plate 54 descends under the influence of the spring 56 to impart a sharp blow to the sales slips directly above the numerals on the printing counter. Upon further rotation of the crank, the cam 57 operates to again raise the printing plate 54.

Figure 3:
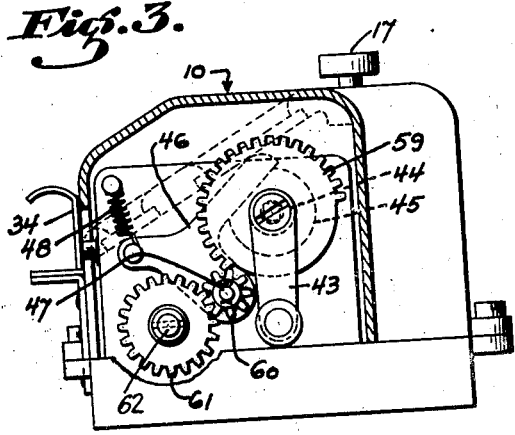
Fig. 3 is a sectional view taken on the line III—III of Fig. 1.

The mechanism for setting the printing counter to zero after the printing operation has taken place is illustrated in Fig. 3 of the drawings, in which figure a mutilated gear 59 is shown as fixed to the shaft 44. The mutilated gear 59 upon being rotated with the shaft 44 engages an idler pinion 60 which is in mesh with a gear 61 fixed to the reset shaft 62 of the printing counter. The ratio between the gears 59, 60 and 61 is such that a complete revolution of the gear is effected upon operation of the crank through one cycle and the printing counter is reset to zero by conventional mechanism that is well known to the art.

The sales slips must now be moved to a position for the next printing operation and this movement is effected by means of a crank 63 which rotates on the same axis and simultaneously with the gear 61 and carries a pin 64. The pin 64 engages a downwardly depending lug 65 on the tray 32 and through such engagement moves the tray rearwardly of the casing the desired distance. This movement of the tray may be facilitated by rollers such as shown at 64a. During this rearward movement of the tray, the lug 38 on the arm 35 rides over an inclined surface 66 on an upturned edge of the tray and then falls behind the abrupt shoulder which terminates this inclined surface. The lug 38 in this position locks the tray in the position to which it has been moved and the presser plate 40, which during this operation of the tray has been undisturbed, causes the sales slip to move with the tray. The presser plate 40 is pivotally mounted on and is carried by the tray, and after the sales slip is placed in position and the closure plate 34 lowered as before described and the presser plate permitted to clamp the sales slip upon the tray, the sales slip moves with the tray and is held in place by the presser plate 40. When the lug 38 is engaged by the inclined surface 66 of the tray to cause it to engage with the shoulder of the tray it is not lifted sufficiently to cause it to engage the arm 39 of the presser plate so that the presser plate is permitted to remain undisturbed in engagement with the sales slip and hold the sales slip firmly in position upon the tray whereby the sales slip is carried with the tray to the second printing position.

At this time the crank 43 has completed its cycle of operation and the zeros have been printed upon the sales slip as illustrated at 67 in Fig. 8. The fluid to be delivered is now permitted to pass through the meter and operation of the meter drives the printing counter in the manner described. When the desired number of gallons has passed through the meter and this number is registered on the printing counter, the control valve is closed and the crank 43 is again rotated through a complete cycle, thus printing the quantity delivered on the slip as indicated at 68 in Fig. 8 of the drawings. This second operation of the crank differs from the first operation above described only in that it does not effect a movement of the sales slip tray.

At this time the operator lifts the plate 34, which causes the lug 38 to engage the arm 39 to release the sales slip, whereupon it may be removed and a copy thereof handed to the customer. The lifting movement of the plate 34 also causes the lug 38 to become disengaged from the shoulder behind the inclined surface 66, thus permitting the tray 32 to return to its original position under tension of the spring 42.

From the foregoing it will be apparent that I have provided a device for combination with a fluid meter which may be operated to print upon a sales slip or the like accurately the number of gallons that have been dispensed through the meter and a device which, though simple in construction and operation, provides ample security against improper recording of the amount of fluid delivered, because the customer is furnished with a sales slip having printed thereon the correct amount of the fluid delivered to him and the printing counting mechanism is locked during the printing operation so that the amount delivered will be accurately printed on the customer's slip.

While I have illustrated and described a preferred form of my invention, it is to be understood that various changes may be resorted to in the construction and arrangement of the several parts thereof within the spirit and scope of the appended claims.

Having thus described my invention, what I claim and desire to secure by Letters Patent is:

1. A device of the character described including a printing counter, a casing enclosing said counter and having a slot formed therein for the reception of a paper slip to be printed upon by said counter, a tray for supporting said slip adjacent the counter for printing operation, a closure member normally covering said slot, clamping means for holding the paper to the tray, means for moving to a disengaging position said clamping means upon opening of said closure member to insert a slip, means for advancing said tray relative to the counter after one printing operation, means for locking said tray in the advanced position for a second printing operation, and means actuated by opening of the closure to release said locking means.

2. A device of the character described including a printing counter, a casing enclosing said counter and having an opening for the insertion of a paper slip to be printed upon by said counter, a tray movably mounted above the counter for supporting said slip adjacent the counter, a movable closure member normally covering the opening in the casing, a presser plate mounted on and carried by the tray for clamping the slip upon the tray, coacting means on the presser plate and the closure member for enabling the closure member to lift the presser plate and permit the slip to be inserted between the presser plate and the tray, and means for advancing the tray relative to the counter after one printing operation and while the slip is held by the presser plate to carry the tray and the slip to a second printing position.

WILLIAM F. BERCK.